United States Patent [19]

Turnbull

[11] Patent Number: 4,806,762
[45] Date of Patent: Feb. 21, 1989

[54] THERMAL RADIATION DETECTOR

[75] Inventor: Andrew A. Turnbull, Reigate, England

[73] Assignee: U.S. Philips Corporation, New York, N.Y.

[21] Appl. No.: 121,368

[22] Filed: Nov. 16, 1987

[30] Foreign Application Priority Data

Dec. 5, 1986 [GB] United Kingdom ............ 8629109

[51] Int. Cl.$^4$ ................................................ G01J 5/20
[52] U.S. Cl. ................................................ 250/338.3
[58] Field of Search ............ 250/338 PY, 338 R, 342, 250/349

[56] References Cited

U.S. PATENT DOCUMENTS 4,704,534  11/1987  Turnbull .......................... 250/349

FOREIGN PATENT DOCUMENTS 2125214  2/1984  United Kingdom .
2150747  7/1985  United Kingdom .
2173038  10/1986  United Kingdom .

Primary Examiner—Carolyn E. Fields
Attorney, Agent, or Firm—William L. Botjer

[57] ABSTRACT

A thermal radiation detector suitable for detecting radiation in a given wavelength range, for example 5 to 15 micrometers, includes a detecting element (10), such as a pyroelectric element, and a structure coupled to the element for improving performance by optimizing the absorption characteristic of the detector over a wide wavelength range. The structure comprises two dielectric layers (12 and 18) preceding the detecting element with optical thicknesses substantially one quarter of a selected wavelength in the wavelength range and an intermediate resistive layer (17) for absorbing incident radiation in the wavelength range. A reflective layer (15) is preferably disposed between the element and the adjacent dielectric layer. The dielectric layers may both comprise ZnS or Ge. One layer may comprise a portion of a flexible film used to support the detector.

14 Claims, 4 Drawing Sheets

THERMAL RADIATION DETECTOR

BACKGROUND OF THE INVENTION

This invention relates to a thermal radiation detector for detecting radiation in a given wavelength range, comprising detecting means having a temperature-dependent characteristic for detecting thermal energy, and, with respect to the direction of incidence of thermal radiation to be detected, a dielectric layer and an electrically resistive layer preceding the detecting means, wherein the electrically resistive layer is disposed immediately adjacent the dielectric layer and has a substantial net effective resistance per square such that the resistive layer absorbs a substantial proportion of incident radiation in said wavelength range and wherein the optical thickness of the dielectric layer is substantially one quarter of a selected wavelength in the wavelength range.

A problem with thermal radiation detectors is to absorb sufficient of the incident radiation. For example, pyroelectric materials suitable for good-quality detectors typically have rather low absorption over at least part of the wavelength range for which it is desirable to provide such detectors; furthermore, the thinner the detector (a feature which is desirable to reduce particularly thermal capacitance as well as its thermal conductance to the surroundings), the lower will be the overall absorption of the incident radiation by the pyroelectric material. A conventional way of improving absorption has been to apply a "black" (blackening); however, appropriate materials have the disadvantages of being awkward to apply and having poor adhesion.

A detector as set forth in the opening paragraph wherein the detecting means comprises an element of pyroelectric material is known from British Patent Application No. 8508204 which corresponds to U.S. Pat. No. 4,704,534 whose disclosure is incorporated herein by reference.

In one form of infrared detector described therein, the dielectric film is constituted by a flexible film which supports the detector means and which is substantially transparent in the wavelength range 8–14 micrometers and is approximately one quarter of a selected wavelength at which it is desired that the absorption of incident radiation by the resistive layer should be a maximum. With the detecting means thermally well coupled to the resistive layer, and by virtue of the flexible film, which provides the mechanical advantage to the detector of low susceptibility to microphony and low lateral thermal conductance, absorption of incident radiation is considerably improved. In one embodiment of the detector, the resistive layer is disposed between the flexible film and the detecting means and its resistance per square is adapted in dependence on the refractive index of the flexible film to optimise the absorption of incident radiation by the layer in the region of the selected wavelength.

In another embodiment, the resistive layer is disposed on the side of the flexible film remote from the detecting means and a reflecting electrically conductive layer interposed between the flexible film and the detecting means.

These detectors provide a good overall incident radiation absorption characteristic in the wavelength range of interest with a very high absorption coefficient at the selected wavelength. The absorption curve is strongly peaked however and either side of this wavelength the value of absorption falls sharply. The rate at which it falls increases with the refractive index of the dielectric layer.

Whilst this absorption response is acceptable for certain applications of the detector, for other applications it would be desirable for the detector to exhibit an optimisation of the absorption characteristic for a wider waveband and it is an object of the invention to provide such a detector,

SUMMARY OF THE INVENTION

According to the present invention, a thermal radiation detector as set out in the opening paragraph is characterised in that detector includes a second dielectric layer on the same side of the detecting means as, and optically in series with, the first dielectric layer with the resistive layer between the first and second dielectric layers and in that the second dielectric layer has an optical thickness substantially equal to one quarter of the selected wavelength.

It has been found that by using a second quarter wavelength dielectric layer in this manner, the detector has an optimised absorption characteristic for a wider waveband around the selected wavelength and that this optimised absorption is substantially constant and maximised over that waveband.

Preferably, a substantially reflecting electrically conductive layer extends over the surface of the detecting means facing the first and second dielectric layers.

With such a structure, the bandwidth for high, substantially constant, absorption is made much greater compared with that provided, for example, the single dielectric layer structure of the device described in the aforementioned British Patent Application 508204. The radiation absorption curve for the detector according to the invention shows a substantially constant peak absorption which although no longer 100% absorption at the selected wavelength approaches very closely 100% absorption, typically greater than 98%, for a wide range of thickness of the dielectric layers and the resistance of the resistive layer. More importantly however, the absorption curve exhibits a reasonably constant absorption at around this level over a range of wavelengths around the selected wavelength rather than having a sharp fall-off on either side of a selected wavelength as found previously. For example, with a selected wavelength of 8 micrometers, the absorption may be at a high level over a bandwidth of around 5 micrometers to 15 micrometers with a gradual fall-off beyond 15 micrometers. At the other end of the bandwidth there is a steep fall-off with an absorption minimum close to zero, typically around 2%, at, dependent on the dielectric layer's thickness, for example around 4 micrometers before rising again for shorter wavelengths. This trough in the absorption curve enables convenient discrimination of the detector response of wavelength range of radiation between, say, 5 and 15 micrometers and that of the shorter, near infra-red wavelengths. This is particularly useful in applications of the thermal detector for intruder detection purposes where the radiation wavelengths of interest are between around 6.5 and 12 micrometers. Used in conjunction with a silicon window acting as a "daylight" filter, which cuts on at about 6.5 micrometer wavelength radiation and falls off in transmission beyond 10 micrometer wavelength radiation, it will be appreciated that, by suitable selection of the selected wavelength, the thermal detector experiences a substantially constant high level of radiation absorption over the range of interest. For a given value of thickness of the dielectric layers, according to the selected wavelength and the refractive index of the materials employed, the fall-off in absorption for longer wavelengths can be reduced by increasing the value of the resistance of the resistive layer. Moreover, it has been found that as the resistance of this layer is increased beyond a certain value a second trough in the absorption wave begins to appear at around the selected wavelength. For optimum absorption over the range of wavelengths 6.5 micrometers to 12 micrometers the value of the thicknesses of the dielectric layers chosen in accordance with a selected wavelength of 8 micrometers and the value of the resistance of the resistive layer at between 90 and 160 ohms per square, and preferbly between 100 and 150 ohms per square, have been found to be particularly suitable.

In one embodiment of the invention, one of the dielectric layers comprises a flexible film which supports the detecting means. This film may be of plastics material, for example a polyimide material, and similar in its construction and its supportive operation as that described in the aforementioned British Patent Application No. 8508204. The flexible film can be used also to support a conductive layer providing electrical connection to the detecting means. Supporting the detecting means by way of the flexible film enables the detector to have particularly low susceptibility to microphony as well as low lateral thermal conductance.

The flexible film advantageously is arranged so that it is immediately preceded by free space, and faces the incoming radiation.

In this embodiment, the other dielectric layer may comprise any suitable dielectric material. In this respect zinc sulphide or germanium have been found to be very satisfactory.

In other embodiments the first and second dielectric layers may both comprise either zinc sulphide or germanium or may comprise zinc sulphide and germanium respectively. In these cases, the detector may be mounted in any convenient manner on a substrate, for example similar to those described in British Patent Specifications No. 2125214 and 2150747.

The detecting means preferably comprises an element of pyroelectric material.

The above-described reflecting layer overlying a surface of the detecting means conveniently may then constitute an electrode for the pyroelectric element, and preferably has a low resistance, for example around one ohm per square, there being a further electrode disposed over the opposed surface of the pyroelectric element.

BRIEF DESCRIPTION OF THE DRAWINGS

Embodiments of the invention will now be described, by way of example, with reference to the accompanying drawings which are diagrammatic and not to scale and in which.

In the drawings, the same reference numerals have been used to designate similar and/or corresponding parts of the various embodiments.

DETAILED DESCRIPTION OF THE PREFERRED EMBODIMENTS

Figure 1:
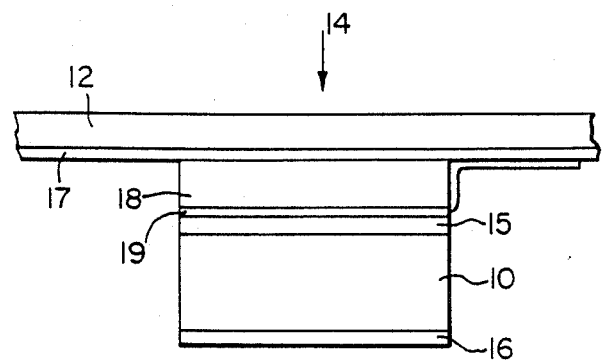
FIG. 1 is a cross-section of a first embodiment of a pyroelectric detector in accordance with the invention.

Referring to FIG. 1, the detector of thermal radiation comprises an element 10 of pyroelectric material supported by a flexible dielectric film 12 of polyimide plastics material. The detector is adapted for radiation that is to be detected to be incident in the direction the arrow 14, the flexible film 12, which therefore precedes the pyroelectric element 10 in the direction of incoming radiation, transmitting a substantial proportion of the incident radiation in the operating wavelength range of the detector. Temperature changes within the pyroelectric element 10 caused by absorption of thermal energy derived from incoming radiation result in charges being produced at opposed faces of the element, namely the upper and lower major surfaces as shown in FIG. 1. The charges are detected by way of electrically conductive contact electrodes 15 and 16 disposed on the upper and lower surfaces respectively. Since charges are developed at the surfaces of the element 10 only while the temperature of the element is undergoing changes, the radiation incident on the detector must vary with time in order that it may be detected. This variation with time may inadvertently be the case in structures where the detector is desired to respond to changes in an otherwise unchanging environment, for example, as in an intruder detector where the image of the intruder scans across the detector; it may alternatively be achieved by scanning the detector across a scene being viewed or by chopping the incoming radiation.

Because the pyroelectric element 10, (especially if it is very thin) may generally absorb very little of the incident radiation over at least part of the operating wavelength range, absorption of radiation to increase the sensitivity of the detector is improved by means of the flexible film 12 operating in conjunction with additional layers between the film and the element 10 including a resistive layer intermediate the film and the element 10. The thickness of the film is chosen to reduce the reflection of incident radiation and has an optical thickness, i.e. the product of its refractive index and physical thickness, which is substantially one quarter of a selected wavelength so as to provide the greatest bandwidth over which reflection is reduced. The selected wavelength is determined bearing in mind that reflection normally increases sharply to a maximum as the wavelength of incident radiation decreases from the selected value to half the selected value but increases only gradually as the wavelength increases, and also taking into account the spectral absorption characteristic of the pyroelectric material of the element 10. The selected wavelength is chosen to be within or perhaps even slightly below the lower limit of the wavelength range over which it is desired to operate the detector.

On the underside of the film 12 as shown in FIG. 1, that is, on the side facing the element 10, there is disposed directly an electrically resistive metal layer 17, of around 0.1 micrometers and with a suitable resistance per square substantially to absorb radiation. Immediately adjacent the lower surface of the resistive layer 17 facing the element 10 there is disposed a further dielectric layer 18 of zinc sulphide which is also of such a physical thickness that its optical thickness is substantially equal to one quarter of the selected wavelength. Evaporated zinc sulphide is compatible with production techniques used for pyroelectric detectors and its refractive index can be controlled to a sufficiently high degree of repeatability. The lower surface of this dielectric layer 18 extends adjacent the upper contact electrode 15. This electrode consists of a mirror metal electrode having a resistance value of approximately one ohm per square.

Since the zinc sulphide layer 18 is substantially electrically insulative, a thin metal electrode 19 having a resistance of around twenty ohms per square is disposed between the layer 18 and electrode 15 in contact with the latter. The electrode 19 has an extension which extends over the edge of the layer 18 and across the underside of the layer 17 as shown via which charges generated by the element 10 are conducted to a detection circuit.

The pyroelectric element 10 may be mounted in the manner described in European Patent Application EP No. 41 297 A suitably using a second flexible film (not shown), for example of polyimide, adjacent the electrode 16 so that the element is sandwiched between, and supported by, this additional film and the film 12. The second film carries a conductive track which contacts the electrode 16. The pyroelectric material of the element 10 may, for example, be PLMZT and the element may have major surfaces which are square with a side of 0.5 mm and a thickness of 20 micrometers obtained by polishing down a thicker slice of the material. The electrodes 16, 19 and 15 may be of sputtered nickel/chromium alloy with the latter coated with gold to provide substantial reflectivity. The resistive layer 17 may also be of nickel/chromium alloy, provided by evaporation of sputtering on the flexible film 12. The zinc sulphide dielectric layer 18 is deposited on the resistive layer by evaporation, followed by the electrode layer 19 being deposited over the exposed surface of layer 18 and, in track form across the layer 17, to form a sub-assembly. The pyroelectric element 10 together with its electrode layers 15 and 16 are formed as a separate sub-assembly and subsequently joined by bonding to the first sub-assembly. Good bonding and electrical and thermal contact between the electrodes 15 and 19 can be obtained by using an ultra-thin layer of adhesive therebetween.

The heat capacitance of the zinc sulphide layer 18 is negligible in comparison with that of the pyroelectric element.

In the case of a detector for which it is desired to maximise absorption of radiation by the resistive layer at wavelengths around 8 micrometers, the aforementioned selected wavelength is taken to be 8 micrometers. Assuming that refractive indexes (n) of the polyimide material of the film 12 and zinc sulphide material of the layer 18 are approximately 1.8 and 2.3 respectively, the thicknesses of the layers 12 and 18 are chosen accordingly to be around 1.11 micrometers: and 0.87 micrometers respectively such that their optical thicknesses are then equal to substantially one quarter of the selected wavelength, that is, 2 micrometers.

The resistive layer 17 has a suitable net effective resistance per square for substantially absorbing radiation. In an example the value of the resistance of the layer 17 is chosen to be 150 ohms per square which has been found to be particularly beneficial.

With this structure, the pyroelectric element 10 is thermally well coupled to the resistive layer 17.

Figure 2:
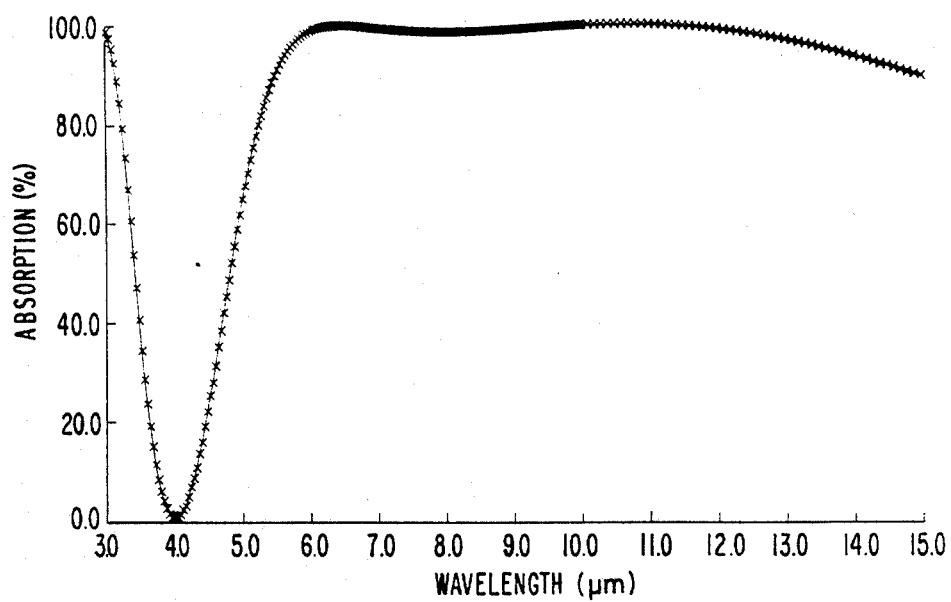
FIG. 2 is a graph illustrating the radiation absorption characteristic of the detector of FIG. 1.

The absorption characteristic of the thermal detector so obtained is illustrated in FIG. 2. With regard to the absorption response shown in this Figure, and those shown in FIGS. 4, and 6 to 8 relating to alternative embodiments to be described, absorption, as a percentage is plotted against wavelength, and it is assumed that the incoming radiation is substantially perpendicular to the exposed surface of the film 12, and the major surfaces of the subsequent layers of the detector's structure which are all parallel to this exposed surface. It is seen from the absorption curve shown in FIG. 2 that the detector has a substantially constant radiation absorption level approaching very closely 100%, and typically around 98% for a wide range of incoming radiation wavelengths from approximately 6 micrometers to 14 micrometers and beyond, thus bestowing the detector with a very wide high absorption bandwidth. For wavelengths shorter than 6 micrometers, absorption falls off sharply, giving a distinct cut-off characteristic and drops practically to zero at 4 micrometers, that is half the selected wavelength, before rising again as the wavelength shortens. Absorption of unwanted wavelengths shorter than 4 micrometers can be avoided conveniently by the suitable choice of a window behind which the detector is mounted which has appropriate spectral characteristics to transmit only radiation having wavelengths of 4 micrometers and greater, thus rendering the detector responsive only to radiation greater than 4 micrometers. For example the detector may be used in conjunction with a silicon window, acting as a daylight filter, which exhibits a cut on characteristic at about 6.5 micrometers and falls of in transmission for wavelengths beyond 10 micrometers. Thus the absorption characteristic of the detector is matched very well to the window with the highest level of absorption corresponding in wavelengths range with the high level transmission range of the window providing optimum response of the wavelength range of interest. The thickness of the dielectric film 12 and dielectric layer 18, and thus by implication the selected wavelength, and the resistance of the layer 17 can be varied within limits to give similar results, and thus allowing some tolerance in manufacture. The trough in the absorption curve shifts along the wavelength axis in accordance with the selected thickness values. For given values of the thickness of the film 12 and layer 18, the fall-off in absorption for wavelengths greater than around 10 micrometers can be reduced by increasing the value of the resistance of the layer 17. However, it has been found that the resistance value is increased beyond a certain value, a second trough in the absorption curve begins to appear near the selected wavelength region. The most satisfactory results have been achieved for intruder detection purposes and the like in which the wavelength range of interest is between around 5 and 15 micrometers with values of the resistance of the layer 17 between 90 and 160 ohms per square and values of the selected wavelengths (and hence thicknesses of the layer 12 and 13) between 5.5 and 9.5 micrometers. Within those values, high absorption of greater than 90% over a wide wavelength range, for example a bandwidth of 9 micrometers, is achieved.

Figure 3:
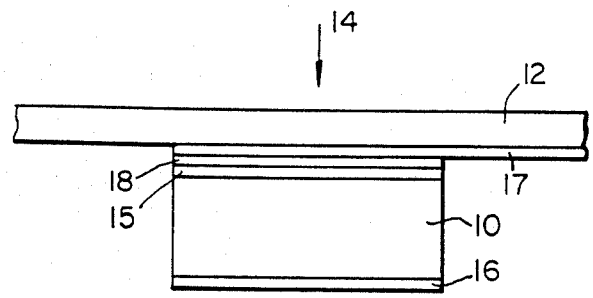
FIG. 3 is a cross-section of a second embodiment of a pyroelectric detector in accordance with the invention.

FIG. 3 is cross-section of a second embodiment of the invention wherein the safe reference numerals are used as in FIG. 1 for corresponding integers. The thermal detector is generally similar to that of FIG. 1 except that the second dielectric layer 18 in this embodiment comrpises germanium (having a refractive index of approximately 4.0) rather than zinc sulphide and that, because the germanium exhibits certain conductive properties, the electrode layer 19 is omitted and the resistive layer 17 used as an electrode electrically connected to the mirror electrode 15 through the layer 18, the layer 17 having an extension leading to a detection circuit. Also, the detector is constructed in a similar manner but with the germanium layer 18 being deposited on the mirror electrode 15 and forming part of the pyroelectric element sub-assembly instead. This sub-assembly is bonded to the resistive layer 17 formed on the flexible film 12 using an ultra-thin layer of adhesive.

Figure 4:
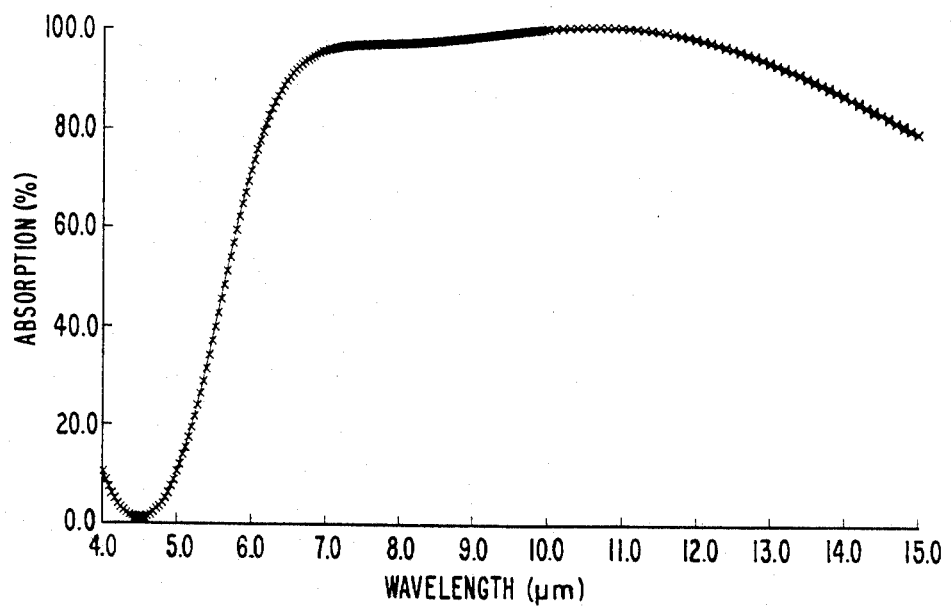
FIG. 4 is a graph illustrating the radiation absorption characteristic of the detector of FIG. 3.

FIG. 4 illustrates the characteristic absorption curve of one example of this embodiment. In this example, the resistance of the resistive layer 17 is again chosen to be 150 ohms per square and the physical thickness of the film 12 1.11 micrometers, corresponding to a selected wavelength of 8 micrometers. The physical thickness of the second, germanium, dielectric layer 18 is however chosen to be 0.5626 micrometers rather than 0.5 micrometers, which is the physical thickness corresponding to an optical thickness of one quarter of the selected wavelength assuming the refractive index of germanium to be approximately 4.0, to illustrate the possibility of a certain degree of variation in the permissible thicknesses of the dielectric layers.

As can be seen from FIG. 4, the detector exhibits very high and substantially constant absorption, approaching 100%, over a wide wavelength range of approximately 5.5 to 11 micrometers, with a sharp fall off to a minimum absorption at around 4.5 micrometers, this minimum being slightly shifted from the 4 micrometers point, i.e. half the selected wavelength, in view of the optical thicknesses of the layer 18 not being exactly equal to one quarter of the selected wavelength.

With regard to the embodiments of thermal detectors described with reference to FIGS. 1 and 3, a number of the detectors may be combined to form a linear array with the flexible film 12 common to all detectors and with a small gap provided between adjacent detectors.

Figure 5:
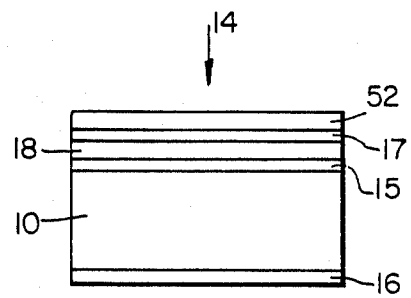
FIG. 5 is a cross-section of a third embodiment of a pyroelectric detector in accordance with the invention.

A further embodiment of thermal detector in accordance with the invention is shown in cross-section in FIG. 5. Again, the same reference numerals are used as in FIGS. 1 and 3 for corresponding integers. The main difference with this embodiment is that the flexible film 12 supporting the pyroelectric element is not employed. Instead, the thermal detector may be supported from beneath directly on a rigid insulative substrate or spaced from a substrate in, for example, manners generally similar to those described in British Patent Specifications Nos. 2150747 and 2125214, with electrical connection to the electrodes 15 and 16 being established by conductors electrically coupled to the electrode 16 and the edge of electrode 15. As such the contact layer 19 in FIG. 1 becomes unnecessary.

The flexible film 12 is replaced by a layer 52 of zinc sulphide or germanium substantially co-extensive with the resistive layer 17, this layer 52 having dielectric properties and an optical thickness substantially equal to one quarter of the selected wavelength. The second dielectric layer 18 may also be of either zinc sulphide or germanium as described with reference to the embodiments of FIGS. 1 and 3. The detector is fabricated in a similar manner as the previous detector embodiments and the above description concerning components thereof relates equally to this embodiment. The pyroelectric element 10 may be larger than those described previously, for example around 2 mm×1 mm×150 micrometers. The detector is particularly suitable for use in an intruder detector system.

Figure 6:
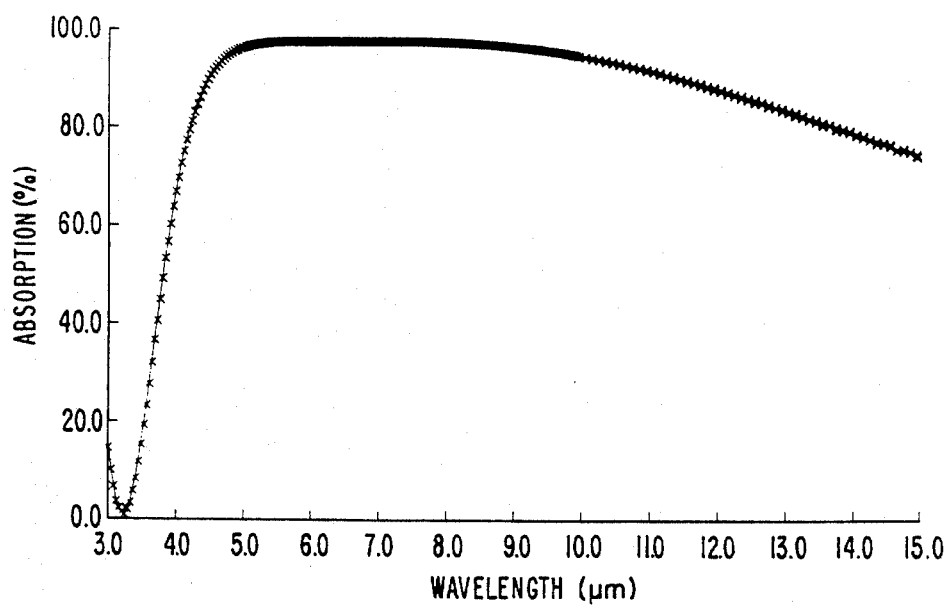
FIGS. 6 to 8 are graphs illustrating respectively the radiation absorption characteristic of the pyroelectric detector of FIG. 5 for different values of dielectric layer thickness and resistive layer resistance.
Figure 7:
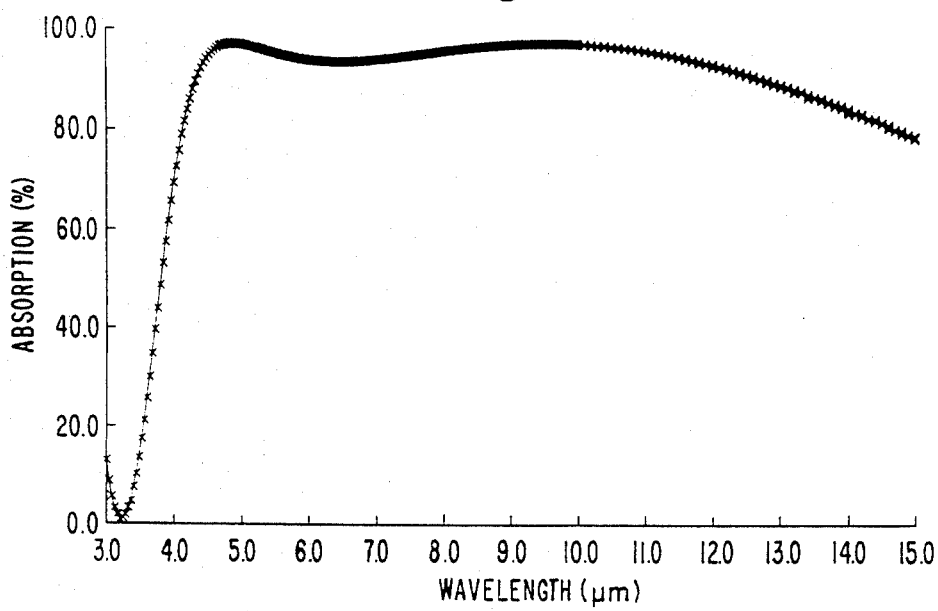
Figure 8:
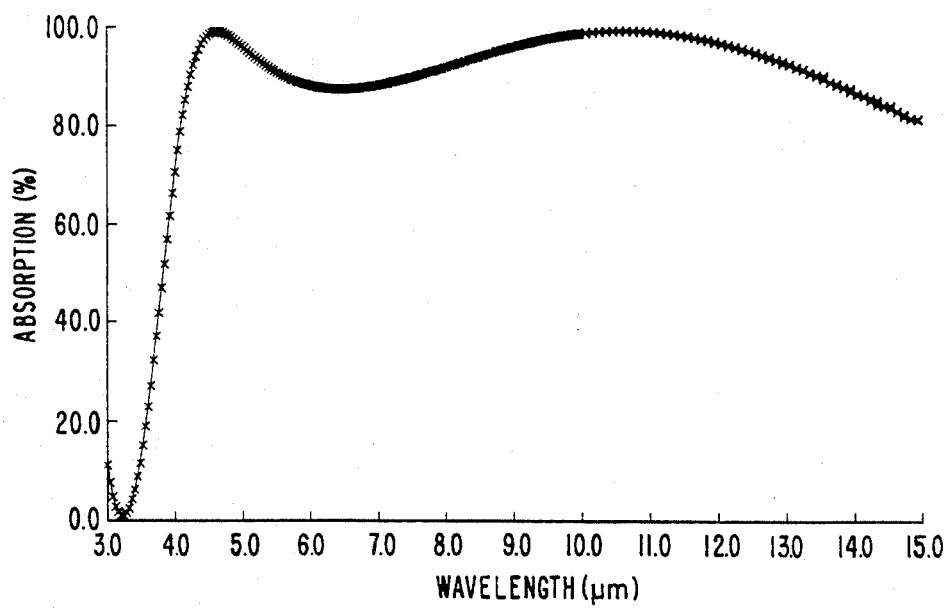

FIGS. 6 to 8 illustrate the characteristic absorption curves of an example of this embodiment of thermal detector for a variety of different resistance values of the resistive layer 17 respectively. In this example, the selected wavelength is chosen to be 6.44 micrometers and both layer 52 and layer 18 comprise zinc sulphide material (refractive index approximately 2.3), having a physical thickness of 0.7 micrometers, and hence an optical thickness of 1.6 micrometers corresponding to one quarter of the selected wavelength. The substantially reflecting mirror electrode 15 has a resistance value of 1.0 ohm per square as before.

FIGS. 6 to 8 show respectively the absorption curves for the detector with the resistive layer 17 having resistance values of 100 ohms per square, 120 ohms per square, 150 ohms per square. As can be seen, all three variants show a wide bandwidth for high level absorption around the selected wavelength. For the resistive layer having a resistance of 100 ; ohms per square, FIG. 6, substantially constant absorption, at around 95-97%, occurs over the region approximately from 5 micrometers to 10 micrometers. Below 5 micrometers, the absorption falls off sharply and approaches zero at 3 micrometers before rising again. For wavelengths greater than 10 micrometers, the absorption decreases but only slightly and is still at a high level of around 80% at 14 micrometers. From FIGS. 7 and 8 it can be seen that as the resistance of the resistive layer 17 increases to 120 ohms per square and 150 ohms per square respectively, a higher level of absorption is obtained for the longer wavelengths. The trough in the absorption curves remains approximately the same in all cases with the minimum absorption being at 3 micrometers. However FIGS. 7 and 8 show that as the resistance value is increased, a second trough starts to appear close to the selected wavelength, i.e. 6.44 micrometers. Above 150 ohms per square, the wavelength region between approximately 5 and 11 micrometers is no longer regarded as being substantially constant and this value is therefore considered to be approximately the upper limit for satisfactory response. For resistance values lower than 100 ohms per square it has been found that the absorption curve peaks at around the selected wavelengths and diminishes more steeply for longer wavelengths than are the cases shown in FIGS. 6 to 8, this decreases the bandwidth over which a substantially constant high level of absorption is obtained. The lower limit for the resistance of the resistive layer 17 for satisfactory response is therefore considered to be approximately 90 ohms per square.

If the selected wavelength is chosen to be greater than 6.44 micrometers, and hence the thickness of the layers 52 and 18 increased accordingly, similar absorption results are achieved but with the absorption curve generally shifted along the wavelength axis such that the substantially constant high level absorption wavelength range and the minimum absorption point occur respectively at proportionally higher wavelengths.

Conversely, if the selected wavelength is chosen to be shorter than 6.44 micrometers, the absorption curve is shifted in the opposite sense.

For optimum absorption over the wavelength range 6.5 micrometers to 12 micrometers, the thickness of the dielectric layers 52 and 18 most satisfactorily lie between approximately 0.7 micrometers and 1.0 micrometers, corresponding to selected wavelengths of 6.4 and 9.2 micrometers respectively but thicknesses corresponding to selected wavelengths of between 5.5 and 9.5 micrometers may be used with acceptable results.

With regard to all the above-described embodiments, the pyroelectric element 10, may be square, circular or rectangular in shape. Also pyroelectric materials other than PLMZT may be employed. Moreover, suitable thermal detecting means other than a pyroelectric element may be used in an embodiment of the invention, for example, a dielectric element whose capacitance changes with temperature, changes of capacitance being measured.

I claim:

1. A thermal radiation detector for detecting radiation in a given wavelength range, comprising detecting means having a temperature-dependent characteristic for detecting thermal energy, and, with respect to the direction of incidence of thermal radiation to be detected, a first dielectric layer and an electrically resistive layer preceding the detecting means, wherein the electrically resistive layer is disposed immediately adjacent the dielectric layer and has a substantial net effective resistance per square such that the resistive layer absorbs a substantial proportion of incident radiation in said wavelength range and wherein the optical thickness of the dielectric layer is substantially one quarter of a selected wavelength in the wavelength range, characterised in that detector includes a second dielectric layer on the same side of the detecting means as, and optically in series with, the first dielectric layer with the resistive layer between the first and second dielectric layers and in that the second dielectric layer has an optical thickness substantially equal to one quarter of the selected wavelength.

2. A thermal radiation detector according to claim 1, characterised in that a substantially reflecting electrically conducting layer extends over the surface of the detecting means facing the first and second dielectric layers.

3. A thermal radiation detector according to claim 1 or claim 2, characterised in that the first dielectric layer comprises zinc sulphide or germanium.

4. A thermal radiation detector according to claim 1, or claim 2 characterised in that the second dielectric layer comprises zinc sulphide or germanium.

5. A thermal radiation detector according to claim 1 or claim 2, characterised in that one of the dielectric layers comprises a flexible film which supports the detecting means.

6. A thermal radiation detector according to claim 5, characterised in that the flexible film comprises a polyimide material.

7. A thermal radiation detector according to claim 5, claim 6, characterised in that the flexible film also supports an electrically conductive layer providing electrical connection to the detecting means.

8. A thermal radiation detector according to claim 5, characterised in that the flexible film is arranged so that it is immediately preceded by free space and faces incoming radiation.

9. A thermal radiation detector according to claim 5, characterised in that the other dielectric film comprises zinc sulphide.

10. A thermal radiation detector according to claim 5, characterised in that the other dielectric film comprises germanium.

11. A thermal radiation detector according to claim 1, characterised in that the detecting means comprises an element of pyroelectric material.

12. A thermal radiation detector according to claim 11, characterised in that the reflecting layer is constituted by an electrode for the pyroelectric element having a low resistance value.

13. A thermal radiation detector according to 1, characterised in that said resistive layer absorbs radiation in the wavelength range of 5 to 15 micrometers.

14. A thermal radiation detector according to claim 13, characterised in that the resistance of the resistive layer is around 90 to 160 ohms per square.

* * * * *